(12) United States Patent
Park et al.

(10) Patent No.: US 12,713,273 B2
(45) Date of Patent: Aug. 18, 2026

(54) METHOD AND DEVICE FOR DETECTING APPLICATION BY USING NETWORK ANALYSIS INFORMATION IN WIRELESS COMMUNICATION SYSTEM

(71) Applicant: Samsung Electronics Co., Ltd., Gyeonggi-do (KR)

(72) Inventors: Jungshin Park, Gyeonggi-do (KR); Dongeun Suh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 227 days.

(21) Appl. No.: 18/434,060

(22) Filed: Feb. 6, 2024

(65) Prior Publication Data

US 2024/0276283 A1 Aug. 15, 2024

(30) Foreign Application Priority Data

Feb. 10, 2023 (KR) ........................ 10-2023-0018242

(51) Int. Cl.
*H04L 43/04* (2022.01)
*H04W 28/02* (2009.01)

(52) U.S. Cl.
CPC ......... *H04W 28/0215* (2013.01); *H04L 43/04* (2013.01)

(58) Field of Classification Search
CPC ............... H04W 28/0215; H04L 43/04; H04L 41/0894; H04L 43/028; H04L 41/14; H04L 43/026; H04L 43/0894
See application file for complete search history.

(56) References Cited

U.S. PATENT DOCUMENTS

2020/0252813 A1* 8/2020 Li ........................ G06Q 20/382
2021/0022022 A1* 1/2021 Guo ...................... H04M 15/66
(Continued)

FOREIGN PATENT DOCUMENTS

EP 4561125 A1 * 5/2025 ............. H04L 12/14
WO WO 2022/008104 1/2022
(Continued)

OTHER PUBLICATIONS

3GPP TR 23.700-81 V18.0.0, 3rd Generation Partnership Project; Technical Specification Group Services and System Aspects; Study on Enablers for Network Automation for the 5G System (5GS); Phase 3 (Release 18), Dec. 2022, 278 pages.
(Continued)

*Primary Examiner* — Johnny B Aguiar
(74) *Attorney, Agent, or Firm* — The Farrell Law Firm, P.C.

(57) ABSTRACT

The disclosure relates to a fifth generation (5G) or sixth generation (6G) communication system for supporting a higher data transmission rate. Disclosed is a method and device for controlling a wireless communication system to detect information about an application in use by analyzing data from a user terminal. A method performed by a network data collection and analysis function (NWDAF) includes receiving, from a network exposure function (NEF), a first message including a terminal identifier (ID) to request analysis information on a validity of packet flow detection (PFD) information; transmitting, to the NEF, a second message as a response to the first message; transmitting, to the NEF, a third message including the terminal ID to request the PFD information; and receiving, from the NEF, a fourth message including the terminal ID and packet detection rule (PDR) information as a response to the third message.

18 Claims, 6 Drawing Sheets

(56) References Cited

U.S. PATENT DOCUMENTS

2021/0099367 A1 4/2021 Han et al.
2022/0022097 A1 1/2022 Jimenez Cordon et al.
2022/0294723 A1* 9/2022 Lee ....................... H04L 43/065
2022/0345865 A1* 10/2022 Munoz De La Torre Alonso ....... H04W 28/0215
2023/0037802 A1* 2/2023 Karampatsis ......... H04W 24/10
2023/0318942 A1* 10/2023 Fan ....................... H04W 24/08 709/224
2024/0107379 A1* 3/2024 Wu ....................... H04W 28/06

FOREIGN PATENT DOCUMENTS

WO WO 2022/019044 1/2022
WO WO-2024032369 A1 * 2/2024 ............. H04L 12/14

OTHER PUBLICATIONS

International Search Report dated May 8, 2024 issued in counterpart application No. PCT/KR2024/001799, 3 pages.

* cited by examiner

Figure 3A:
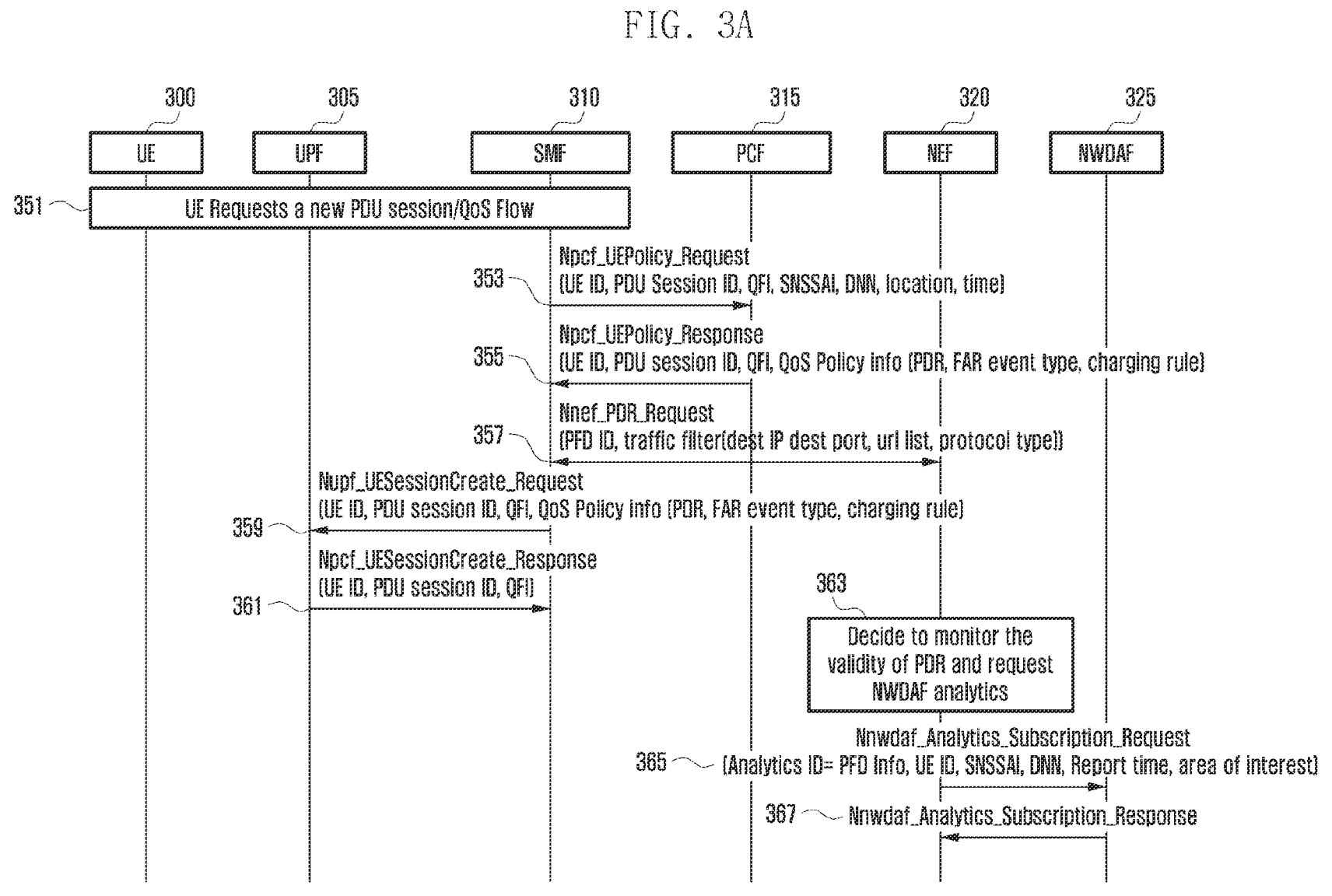

300 UE
305 UPF
310 SMF
315 PCF
320 NEF
325 NWDAF

351 UE Requests a new PDU session/QoS Flow

353 Npcf_UEPolicy_Request
(UE ID, PDU Session ID, QFI, SNSSAI, DNN, location, time)

355 Npcf_UEPolicy_Response
(UE ID, PDU session ID, QFI, QoS Policy info (PDR, FAR event type, charging rule)

357 Nnef_PDR_Request
(PFD ID, traffic filter(dest IP dest port, url list, protocol type))

359 Nupf_UESessionCreate_Request
(UE ID, PDU session ID, QFI, QoS Policy info (PDR, FAR event type, charging rule)

361 Npcf_UESessionCreate_Response
(UE ID, PDU session ID, QFI)

363 Decide to monitor the validity of PDR and request NWDAF analytics

365 Nnwdaf_Analytics_Subscription_Request
(Analytics ID= PFD Info, UE ID, SNSSAI, DNN, Report time, area of interest)

367 Nnwdaf_Analytics_Subscription_Response

FIG. 3B

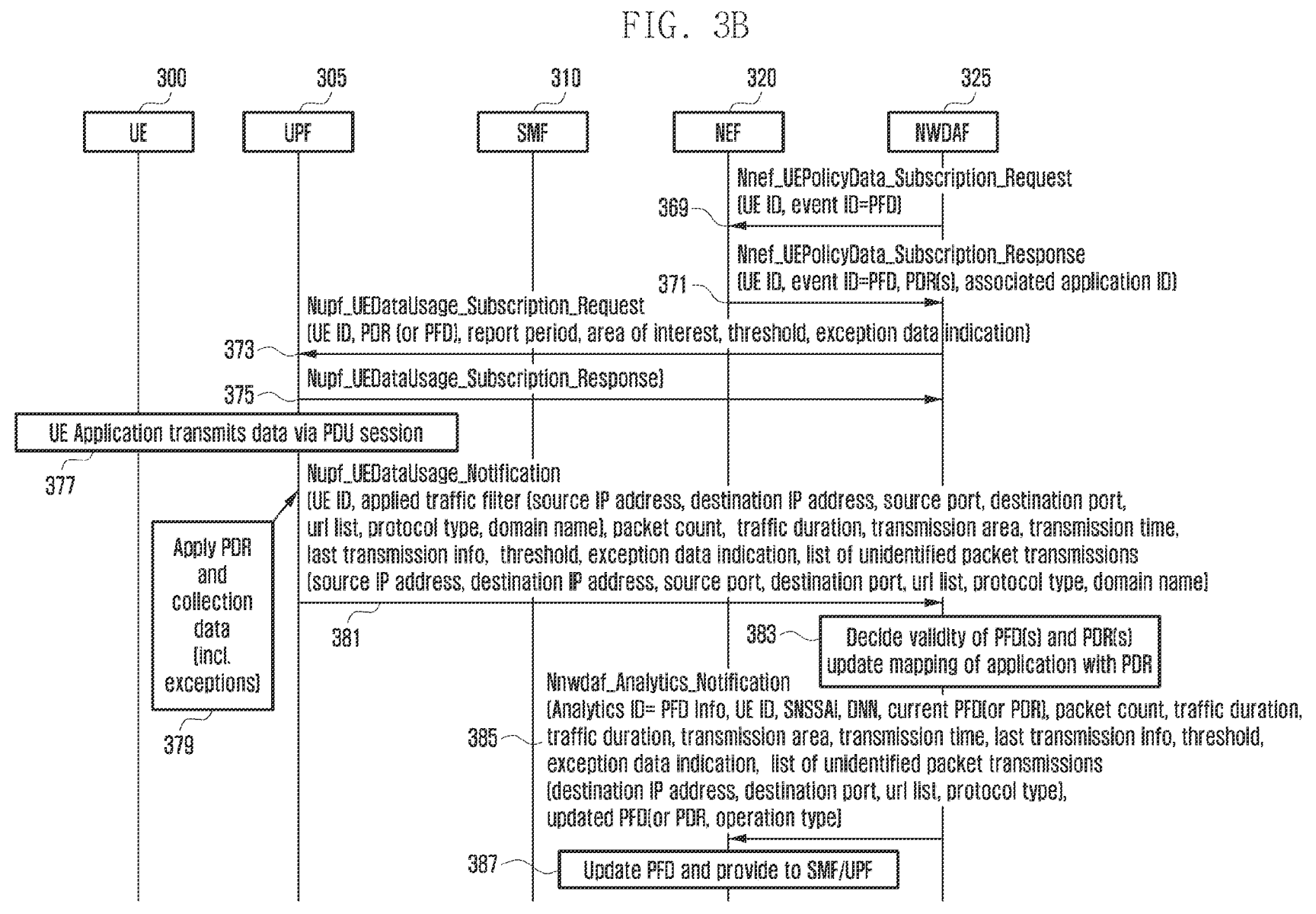

300 UE
305 UPF
310 SMF
320 NEF
325 NWDAF

369 Nnef_UEPolicyData_Subscription_Request
(UE ID, event ID=PFD)

371 Nnef_UEPolicyData_Subscription_Response
(UE ID, event ID=PFD, PDR(s), associated application ID)

373 Nupf_UEDataUsage_Subscription_Request
(UE ID, PDR (or PFD), report period, area of interest, threshold, exception data indication)

375 Nupf_UEDataUsage_Subscription_Response)

377 UE Application transmits data via PDU session

379 Apply PDR and collection data (incl. exceptions)

381 Nupf_UEDataUsage_Notification
(UE ID, applied traffic filter (source IP address, destination IP address, source port, destination port, url list, protocol type, domain name), packet count, traffic duration, transmission area, transmission time, last transmission info, threshold, exception data indication, list of unidentified packet transmissions (source IP address, destination IP address, source port, destination port, url list, protocol type, domain name)

383 Decide validity of PFD(s) and PDR(s) update mapping of application with PDR

385 Nnwdaf_Analytics_Notification
(Analytics ID= PFD info, UE ID, SNSSAI, DNN, current PFD(or PDR), packet count, traffic duration, traffic duration, transmission area, transmission time, last transmission info, threshold, exception data indication, list of unidentified packet transmissions (destination IP address, destination port, url list, protocol type), updated PFD(or PDR, operation type)

387 Update PFD and provide to SMF/UPF

METHOD AND DEVICE FOR DETECTING APPLICATION BY USING NETWORK ANALYSIS INFORMATION IN WIRELESS COMMUNICATION SYSTEM

CROSS-REFERENCE TO RELATED APPLICATION(S)

This application is based on and claims priority under 35 U.S.C. § 119 to Korean Patent Application No. 10-2023-0018242, filed on Feb. 10, 2023, in the Korean Intellectual Property Office, the disclosure of which is incorporated herein by reference in its entirety.

BACKGROUND

1. Field

The disclosure relates generally to a method and a device for detecting an application used by a user equipment (UE) by using network analysis information in a wireless communication system.

2. Description of Related Art

Fifth generation (5G) mobile communication technologies define broad frequency bands such that high transmission rates and new services are possible, and can be implemented not only in sub 6 gigahertz (GHz) bands such as 3.5 GHz, but also in above 6 GHz bands referred to as millimeter wave (mmWave) including 28 GHz and 39 GHz. In addition, it has been considered to implement sixth generation (6G) mobile communication technologies (referred to as beyond 5G systems) in terahertz (THz) bands (e.g., 95 GHz to 3 THz bands) to accomplish transmission rates fifty times faster than 5G mobile communication technologies and ultra-low latencies one-tenth of 5G mobile communication technologies.

Since the initial development of 5G mobile communication technologies, to support services and to satisfy performance requirements in connection with enhanced mobile broadband (eMBB), ultra reliable low latency communications (URLLC), and massive machine-type communications (mMTC), there has been ongoing standardization regarding beamforming and massive multi input multi output (MIMO) for mitigating radio-wave path loss and increasing radio-wave transmission distances in millimeter wave (mmWave), supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

There are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, non-terrestrial network (NTN) which is UE-satellite direct communication for providing coverage in an area in which communication with terrestrial networks is unavailable, and positioning.

There is also ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step random access channel (RACH) for NR). There is also ongoing standardization in system architecture/service regarding a 5G service based architecture or service based interface for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum, and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

With the development of mobile communication systems as described above, a wireless communication system has become more complex and can provide various services. To enable provision of differential charging and service quality for each type of these various services, however, there is a need in the art for technology for performing control to analyze transmission data of a UE within a wireless communication system and detect an application being used.

SUMMARY

This disclosure has been made to address at least the above-mentioned problems and/or disadvantages and to provide at least the advantages described below.

Accordingly, an aspect of the disclosure is to provide a method and a device for collecting and analyzing data transmitted by a UE in a wireless communication system.

An aspect of the disclosure is to provide a method and a device for analyzing data transmitted by a UE and detecting the type of related application.

An aspect of the disclosure is to provide a method and a device for collecting data of a UE from a network entity which provides a data analysis and collection function in a wireless communication system.

An aspect of the disclosure is to provide a method and a device for controlling a signal flow between network function (NF) entities for collecting data of a UE.

An aspect of the disclosure is to provide a method and a device for controlling a series of signal flows for detecting an application used by a UE based on a result of collecting and analyzing UE data from each network.

In accordance with an aspect of the disclosure, a method performed by a network data collection and analysis function (NWDAF) in a wireless communication system includes receiving, from a network exposure function (NEF), a first message including a terminal identifier (ID) to request analysis information on a validity of packet flow detection (PFD) information, transmitting, to the NEF, a second message as a response to the first message, transmitting, to the NEF, a third message including the terminal ID to request the PFD information and receiving, from the NEF, a fourth message including the terminal ID and packet detection rule (PDR) information as a response to the third message.

In accordance with an aspect of the disclosure, an NWDAF in a wireless communication system includes a transceiver and a controller configured to receive, from an NEF, a first message including a terminal ID to request analysis information on a validity of PFD information, to transmit, to the NEF, a second message as a response to the first message, to transmit, to the NEF, a third message including the terminal ID to request the PFD information, and to receive, from the NEF, a fourth message including the terminal ID and PDR information as a response to the third message.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 illustrates an operation for detecting an application being used by collecting and analyzing traffic information of a user by using a network data analysis function according to an embodiment;

FIGS. 3A and 3B illustrate a procedure in which a network data analysis function collects and analyzes traffic information of a user to update detection information for detecting an application being used, and uses the updated information for charging and transmission rate control, according to an embodiment;

DETAILED DESCRIPTION

Figure 1:
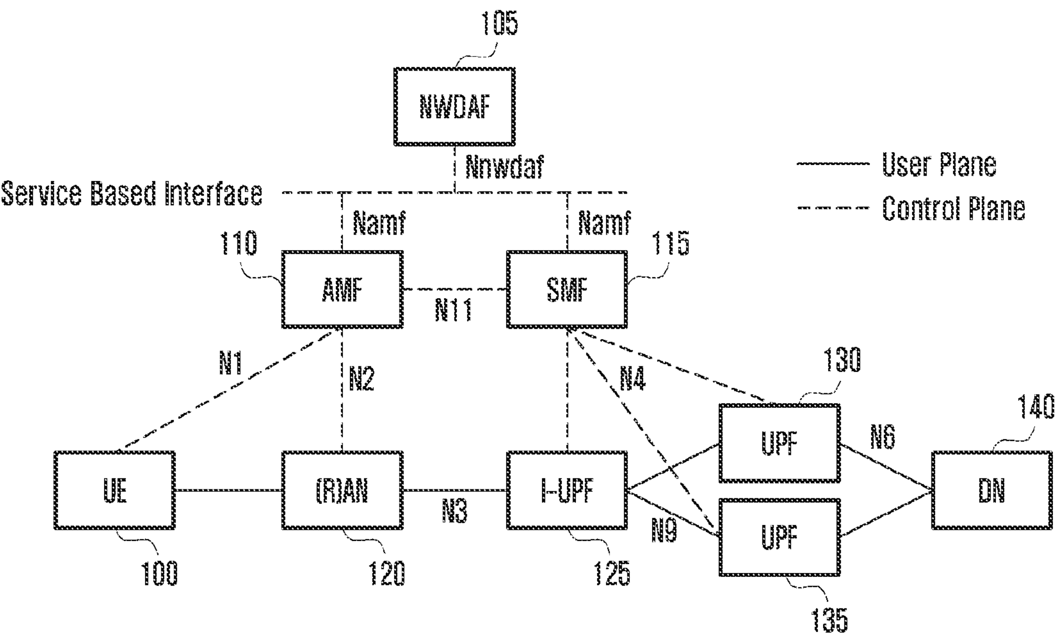
FIG. 1 illustrates a wireless communication network including an NWDAF according to an embodiment.

Hereinafter, embodiments of the disclosure will be described in detail with reference to the accompanying drawings. In the drawings, the same or like elements are designated by the same or like reference signs as much as possible. A detailed description of known functions or configurations will be omitted for the sake of clarity and conciseness.

Herein, descriptions related to technical contents well-known in the art and not associated directly with the disclosure will be omitted to prevent obscuring of the main aspects of the disclosure.

In the accompanying drawings, some elements may be exaggerated, omitted, or schematically illustrated. The size of each element does not completely reflect the actual size. Identical or corresponding elements are provided with identical reference numerals.

Advantages and features of the disclosure and ways to achieve them will be apparent by making reference to embodiments as described below in detail in conjunction with the accompanying drawings. However, the disclosure is not limited to these embodiments and may be implemented in various different forms. The following embodiments are provided only to completely disclose the disclosure and inform those skilled in the art of the scope of the disclosure.

Herein, the term unit refers to a software element or a hardware element, such as a field programmable gate array (FPGA) or an application specific integrated circuit (ASIC), which performs a predetermined function. However, the unit does not always have a meaning limited to software or hardware. The unit may be constructed either to be stored in an addressable storage medium or to execute one or more processors. Therefore, the unit includes software elements, object-oriented software elements, class elements or task elements, processes, functions, properties, procedures, subroutines, segments of a program code, drivers, firmware, micro-codes, circuits, data, database, data structures, tables, arrays, and parameters. The elements and functions provided by the unit may be either combined into fewer elements, or a unit, or divided into more elements, or a unit. Moreover, the elements and units or may be implemented to reproduce one or more central processing units (CPUs) within a device or a security multimedia card.

In the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

In the following description, some of terms and names defined in the 3rd generation partnership project long term evolution (3GPP LTE)-based communication standards (e.g., standards for 5G, NR, LTE, or similar systems) will be used for the sake of descriptive convenience. However, the disclosure is not limited by these terms and names, and may be applied in the same manner to systems conforming to other standards.

Herein, terms for identifying access nodes and for referring to network entities, messages, interfaces between network entities, various identification information, and the like are illustratively used for the sake of descriptive convenience. Therefore, the disclosure is not limited by the terms as used below, and other terms referring to subjects having equivalent technical meanings may be used.

The disclosure is directed to NR as a radio access network (RAN) and packet core (5G system, 5G core network, or next generation core (NG Core)) as a core network, which are specified in the 5G mobile communication standards defined by the 3GPP that is a mobile communication standardization group. The disclosure may be applied to other communication systems having similar backgrounds or channel types through some modifications without significantly departing from the scope of the disclosure.

In a 5G system, an NWDAF provides a function of analyzing and providing data collected in a 5G network and may be defined to support network automation. The NWDAF may collect information from the 5G network, store and analyze the information, and provide a result of the analysis to at least one NF, and the analysis result may be independently used by each NF.

In the 5G mobile communication system, NFs support the use of a collection and analysis result of network-related data through the NWDAF to provide collection and analysis of network data necessary for each NF and effectively provide its own functions in a centralized form. The NWDAF may collect and analyze network data by using a network slice as a basic unit. However, the scope of the disclosure is not limited to a network slice unit, and the NWDAF may additionally analyze a UE, a protocol data unit (PDU) session, an NF state, and/or various pieces of information (e.g., service quality) obtained from an external service server.

The result analyzed through the NWDAF may be delivered to each NF having requested the corresponding analysis result, and the delivered analysis result may be used to optimize network management functions through improvement of quality of service (QoS), traffic control, mobility management, and load balancing.

A unit node which performs each function provided by the 5G network system may be defined as an NF entity or NF node. Each NF may include at least one of an access and mobility management function (AMF) that manages access and mobility of a UE to an access network (AN), a session management function (SMF) that performs session-related management, a user plane function (UPF) that manages user data plane, and a network slice selection function (NSSF) that selects a network slice instance available to the UE.

FIG. 1 illustrates a wireless communication network including NWDAF according to an embodiment.

Referring to FIG. 1, an NWDAF 105 may collect network data in various manners from at least one of source NFs in a 5G core network such as an AMF 110, an SMF 115, UPFs 130 and 135, and an I-UPF 125, an application function (AF) for efficiently providing a service, an NEF, or an operation, administration, and maintenance (OAM). The AMF 110 is connected to a UE 100 and a RAN 120, and the UPFs 130 and 135 and the I-UPF 125 may connect user traffic of the UE 100 through the RAN 120 to at least one data network (DN) 140.

In addition, the NWDAF 105 may provide analysis of network data collected from a network or the outside to at least one consumer NF, may collect and analyze a load level of a network slice instance, and may provide the same to an NSSF so that a specific UE can use the same for selection. A service based interface defined in the 5G network may be used to request analysis information or deliver the analysis information including an analysis result between the NFs 110 and 115 and the NWDAF 105. A hypertext transfer protocol (HTTP) and/or JavaScript object notation (JSON) document may be used as a delivery method but the disclosure is not limited thereto.

The collected data of the NWDAF 105 may include at least one of an application ID, Internet protocol (IP) filter information, or a media/application bandwidth from a point coordination function (PCF), a UE ID or location information from the AMF 110, a destination data network name (DDN), a UE IP, a QoS flow bit rate, a QoS flow ID (QFI), a QoS flow error rate, a QoS flow delay from the SMF 115, or a traffic usage report from a UPF.

The NWDAF 105 may additionally collect at least one of an NF resource status, an NF throughput, or service level agreement (SLA) information from an OAM, which is an entity that may affect a connection between a UE and a service server, a UE status, UE application information, a UE usage pattern from a UE, a service application ID, a service experience, or a traffic pattern from an AF, in addition to the NFs configuring the core network, and use the additionally collected information for analysis.

Table 1, Table 2 and Table 3 below show examples of network data collected by the NWDAF 105. A period and a time point at which the NWDAF 105 collects network data from each entity may be different for each entity. In addition, the correlation of collected data may be distinguished though a correlation ID for correlating data of each object to be collected and a timestamp for recording a collection time.

TABLE 1

| Information | Source | Description |
|---|---|---|
| Application ID | AF | To identify the service and support analytics per type of service (the desired level of service) |
| IP filter information | AF | Identify a service flow of the UE for the application |
| Locations of Application | AF/NEF | Locations of application represented by a list of DNAI(s). The NEF may map the AF-Service-Identifier information to a list of DNAI(s) when the DNAI(s) being used by the application are statically defined. |
| Service Experience | AF | Refers to the QoE per service flow as established in the SLA and during on boarding. It can be either e.g. MOS or video MOS as specified in ITU-T P.1203.3 or a customized MOS |
| Timestamp | AF | A time stamp associated to the Service Experience provided by the AF, mandatory if the Service Experience is provided by the ASP. |

TABLE 2

| Information | Source | Description |
|---|---|---|
| Timestamp | 5GC NF | A time stamp associated with the collected information. |
| Location | AMF | The UE location information. |
| SUPI(s) | AMF | If UE IDs are not provided as target of analytics reporting for slice service experience, AMF returns the UE IDs matching the AMF event filters. |
| DNN | SMF | DNN for the PDU Session which contains the QoS flow |
| S-NSSAI | SMF | S-NSSAI for the PDU Session which contains the QoS flow |
| Application ID | SMF | Used by NWDAF to identify the application service provider and application for the QoS flow |
| IP filter information | SMF | Provided by the SMF, which is used by NWDAF to identify the service data flow for policy control and/or differentiated charging for the QoS flow |
| QFI | SMF | QoS Flow ID |
| QoS flow Bit Rate | UPF | The observed bit rate for UL direction; and The observed bit rate for DL direction |
| QoS flow Packet Delay | UPF | The observed Packet delay for UL direction; and The observed Packet delay for the DL direction |
| Packet transmission | UPF | The observed number of packet transmission |
| Packet retransmission | UPF | The observed number of packet retransmission |

TABLE 3

| Information | Source | Description |
|---|---|---|
| Timestamp | OAM | A time stamp associated with the collected information. |
| Reference Signal Received Power | OAM | The per UE measurement of the received power level in a network cell, including SS-RSRP, CSI-RSRP as specified in clause 5.5 of TS 38.331 and E-UTRA RSRP as specified in clause 5.5.5 of TS 36.331 |
| Reference Signal Received Quality | OAM | The per UE measurement of the received quality in a network cell, including SS-RSRQ, CSI-RSRQ as specified in clause 5.5 of TS 38.331 and E-UTRA RSRQ as specified in clause 5.5.5 of TS 36.331 |
| Signal-to-noise and interference ratio | OAM | The per UE measurement of the received signal to noise and interference ratio in a network cell, including SS-SINR, CSI-SINR, E-UTRA RS-SINR, as specified in clause 5.1 of TS 38.215 |

Figure 2:
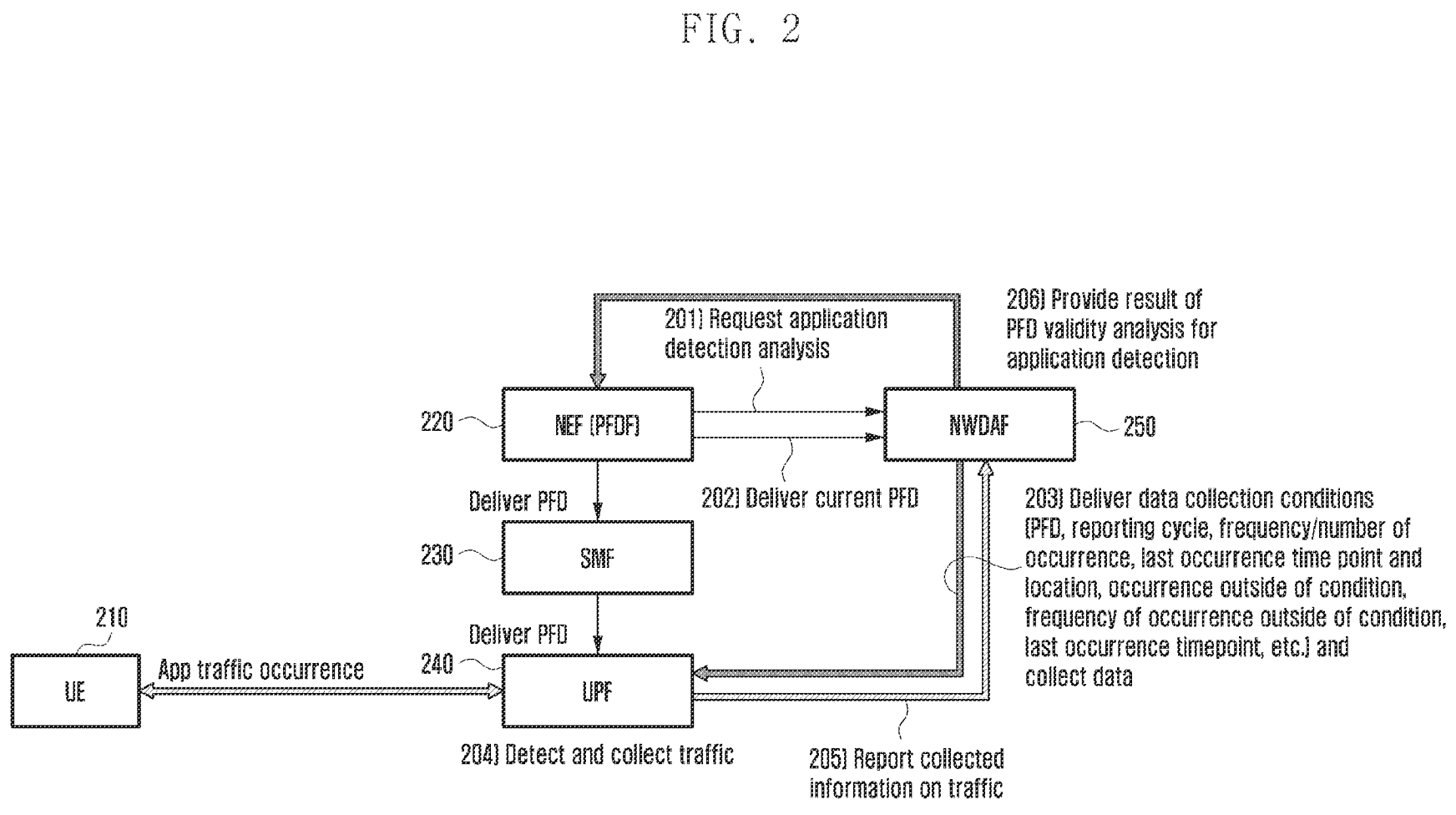

FIG. 2 illustrates an operation for detecting an application being used by collecting and analyzing traffic information of a user by using a network data analysis function according to an embodiment.

An NEF 220 of a wireless communication system provides service quality (e.g., a required transmission rate, transmission delay, delay variation, etc.) and differential charging required by each application used by a UE 210, and may be used by storing characteristic information (PFD information) for detecting application traffic provided from an application provider or specified through a separate configuration process of a communication service provider in a unified data repository (UDR) or its own storage as a PDR. Such PDR information may include traffic filter information for detecting application traffic, and a traffic filter may include at least one piece of information among a source IP address, a destination IP address, a source port, a destination port, a protocol type, a uniform resource locator (URL) list, and a domain name list. The PDR information may be stored as PFD information together with ID information of an application corresponding to the PDR. An NF that stores the PFD information may be defined as a PFD function (PFDF), and depending on implementation, the NEF 220 may be in charge of a function of the PFDF. The PFDF may detect an application being used by the UE by using the PDR information configuring the PFD information and an application ID stored together therewith to distinguish an application. That is, it may be possible to detect an application being used by a user by applying the PDR to detect a user's traffic mapped thereto and identifying an application ID stored in the PDR in relation thereto. Such a process depends on the accuracy of the PFD information stored in the PFDF. If the stored information is inaccurate, application detection may not be possible or errors may occur.

An application service provider of an application used by the UE 210 can generally provide a service by designating servers in various locations in consideration of a specific location of the UE, a specific time, or the total amount of traffic generated from multiple users, or additionally install or delete a server as needed. In case that a service is provided using the changed server, information on the characteristics of traffic transmitted to the corresponding server may differ from PFD (or PDR) information provided in advance by the application service provider to a communication service provider. Accordingly, a problem may occur in which the communication service provider is unable to detect application traffic since the communication service provider is not aware of changes made by the application service provider, and as a result, a problem may occur in which the differential transmission quality and charging requested by the application cannot be applied. To solve such a problem, a method of detecting the characteristics of traffic transmitted by the UE 210 by using a network data analysis function 250, evaluating the validity of PFD (or PDR) information provided by an application service provider from the detected characteristics, and providing updated PFD (or PDR) information are provided herein.

In step 201, the NEF 220 in charge of the function of the PFDF may request the NWDAF 250 to provide analysis information for application detection. In step 202, the NWDAF 250 may request PFD information currently being applied to the UE 210 from the NEF 220 to provide the analysis information, and receive the PFD information currently being applied to the UE 210 from the NEF 220.

In step 203, the NWDAF 250 may request a UPF 240 to collect information on the characteristics of traffic transmitted by the UE 210 (depending on implementation, by making a request directly to the UPF 240 or making a request to the UPF 240 through an SMF 230 or another NF). In this case, as a data collection condition, the NWDAF 250 may specify to deliver the PFD information received from the NEF 220 to the UPF and apply the PDR included in the PFD so as to collect traffic characteristic information of the UE, which is matched or unmatched. In addition, information for specifying a reporting cycle of the collected data together with the collection condition may be included. The NWDAF 250 may specify to collect, as a collection condition, at least one piece of information among the frequency and the number of occurrence of traffic which matches a specific PDR included in the PFD information, a transmission rate, the last occurrence time point and location of traffic which matches the PDR, the frequency and the number of occurrence, a transmission rate, and the last occurrence time point and location of traffic collected for traffic which does not match the PDR, and the ratio of traffic which does not match the specific PDR to traffic which matches the specific PDR.

In step 204, the UPF 240 may detect and/or collect information on user traffic by applying the received PFD information and collection condition. In step 205, the UPF 240 may report the collected information to the NWDAF 250. The UPF 240 may report the collected information to the NWDAF 250 in case that a condition for the collected information is satisfied or at every specified cycle.

In step 206, the NWDAF 250 may analyze the information collected from the UPF to analyze the validity of the PFD information stored by the NEF for use in detecting the current application, and report a result of the analysis of the validity of the PFD information to the NEF 220. Alternatively, the NWDAF 250 may transmit analysis information including the changed information to the NEF 220 in case that new PFD information is required to be added or PFD information is required to be changed for the corresponding application.

The NEF 220 may delete, for each application, PFD information that is no longer valid or unused for use in detection of an application, replace PFD information with the updated PFD information received from the NWDAF 250, or add new applicable PFD information, by using the analysis information received from the NWDAF. For example, in case that the information received from the NWDAF 250 indicates that if no application traffic matching a PDR included in PFD information currently stored in the NEF 220 occurs for a predetermined period of time and traffic to which a new destination IP address, destination port, protocol type, and the like is applied has occurred for a URL, a domain name, etc. used by the corresponding application, the NEF 220 may determine to configure new PDR information obtained by replacing the PDR information included in the PFD information stored to detect the application with the received new destination IP address, destination port, protocol type, and the like by using the information received from the NWDAF 250, and to change the existing PFD information to new PFD information including the new PDR information. The new PFD information may be provided to the SMF 230 and the UPF 240 for detection of application traffic.

FIGS. 3A and 3B illustrate a procedure in which a network data analysis function collects and analyzes traffic information of a user to update detection information for detecting an application being used, and uses the updated information for charging and transmission rate control, according to an embodiment.

in step 351, UE 300 may transmit a message for requesting a network to generate a new PDU session or anew QoS flow. The message may be transmitted to a UPF 305 and an SMF 310 through a RAN.

In step 353, the SMF 310, which has received the request message from the UE 300, may transmit, to a PCF 315, a message for requesting a policy to be applied to the PDU session or QoS flow requested by the UE 300. The message may include at least one piece of information among a UE ID, a PDU session ID generated or changed, a QoS flow ID (QFI), a network slice ID (SNSSAI), a data network name (DNN), and a location and a request time of a UE.

In step 355, the PCF 315 may transmit, to the SMF 310, policy information to be applied to the newly generated PDU session or QoS flow for the UE 300. A control message for delivering the policy information may include at least one of a UE ID, a PDU session ID, a QFI, and policy and charging rule (PCC rule) information. The policy and charging rule information specifies traffic transmitted through a generated PDU session or QoS flow, and may include a source/destination IP address, source/destination port number, and protocol type information. In addition, information such as an event type value for specifying to perform reporting when a specific event occurs, a charging rule to be applied to the detected packet, or an address of a charging server may be included.

In step 357, the SMF 310 may select PFD information mapped to the source/destination IP address, source/destination port number, and protocol type information for specifying traffic included in the policy and charging rule information received from the PCF 315. To this end, the SMF 310 may receive and store the PFD information from an NEF 320 responsible for a function of a PFDF in advance. If there is no suitable PFD information to be applied to the currently generated PDU session or QoS flow among the stored PFD information, the SMF 310 may perform a process of transmitting information on the currently generated PDU session or QoS flow to the NEF 320, and receiving PFD information to be applied to the currently generated PDU session or QoS flow from the NEF 320.

In step 359, the SMF 310 may transmit a request message for generating a newly generated PDU session or QoS flow to the UPF 305. The request message may include at least one piece of information among UE ID, PDU session ID, QFI, PFD, forwarding action rule (FAR), event type, and charging data generation and reporting address information. Among the information, PDR information may include information for specifying a method of transmitting PDR information included in PFD information received from a PFDR to the UPF 305 and processing detected packets by applying a corresponding PDR to an FAR.

In step 361, the UPF 305 may transmit a response message to the SMF 310 to inform that a configuration for the PDU session or QoS flow requested by the SMF has been completed. The response message may include at least one piece of information among the UE ID, PDU session ID, and QFI information.

In step 363, the NEF 320 may determine to request analysis information from an NWDAF 325 to identify the validity of PFD information used to detect traffic of an application.

In step 365, the NEF 320 may transmit a message for requesting the analysis information on the validity of the PFD information to the NWDAF 325. The message may include at least one piece of information among analytics ID, UE ID, SNSSAI, DNN, report time, and area of interest information. In this case, the analytics ID may be specified as a value (analytics ID=PFD info) for requesting the analysis information on the PFD information, the SNSSAI may specify a network slice required to be analyzed, and the DNN may be specified as a value for indicating a data network. In addition, the report time may be specified as a value which configures a time or a cycle at which the analysis information is required to be reported. The area of interest may be specified as a value indicating an area where traffic is to be analyzed.

In step 367, the NWDAF 325 may transmit a response message to the request from the NEF 320.

In step 369, the NWDAF 325 may transmit a message for requesting information on the PFD currently being used to the NEF 320. The message may include at least one piece of information among a UE ID and an event ID. The event ID may be information which identifies a PFD.

In step 371, the NEF 320 may include the information on the PFD currently being used in a response message and transmit the message to the NWDAF 325. The response message may include at least one piece of information among a UE ID, an event ID, a PDR, and an associated application ID.

In step 373, the NWDAF 325 may transmit, to the UPF 305, a message for requesting to collect information on traffic of the UE. The message may refer to the PFD information received in step 371 to specify data to be collected by the UPF, and thus include at least one piece of information among a UE ID, a PDR (or PFD information), a report period, an area of interest, a threshold, and an exception data indication. The PDR (or PFD) information may include a traffic filter, and the traffic filter may include at least one piece of information among a source IP address, a destination IP address, a source port, a destination port, a protocol type, a URL list, and a domain name. The report period specifies a reporting cycle, the area of interest includes information on an area from which data is to be collected, and the threshold specifies a reference value for configuring to perform reporting in case that the amount or ratio of matched or unmatched traffic exceeds a specified value. The exception data indication may be used to specify whether to collect data (exception data) for unmatched user traffic in case that a PDR (included in a PED in case that the PFD is received) is applied.

In step 375, the UPF 305 may transmit a response message to the request from the NWDAF 325.

In step 377, the UE 300 may transmit data of the application to an application server through the generated PDU session or QoS flow.

In step 379, the UPF 305 may perform a process of collecting information on detected or undetected user data packets by applying PDR information (included in a PFD) or a traffic filter specified by the NWDAF 325 for traffic transmitted by the UE 300.

In step 381, the UPF 305 may transmit information on the traffic of the UE collected through operation 379 to the NWDAF 325. The information on the traffic may include at least one piece of information among a UE ID, an applied traffic filter (a source IP address, a destination IP address, a source port, a destination port, a URL list, a protocol type, and a domain name) which is filter information applied to detection, a packet count which indicates the number of matched or unmatched packets, a traffic duration which indicates a period during which traffic has occurred, a transmission area which indicates an area from which traffic has been transmitted, a transmission time which indicates a time at which traffic has been transmitted, last transmission info which indicates a time and an area at which the last traffic has been transmitted, a threshold which indicates a reporting reference value specified by the NWDAF, an exception data indication which indicates whether to collect data which does not match a PDR, a list of unidentified packet transmissions (a source IP address, a destination IP address, a source port, a destination port, a URL list, a protocol type, and a domain name) which is information collected about exception data that has occurred, and the ratio of the number of packets (or each measurement quantity) which do not match an applied PDR to the number of packets (or transmission time) which match the applied PDR.

In step 383, the NWDAF 325 may analyze the validity of the PFD information currently being used from the collected information and determine whether the PFD information is required to be updated or discarded or a new PFD is required to be added. For example, in case that traffic transmitted from a user application during a reporting cycle is detected by applying a PDR specified as the collection condition, in the case where the ratio of packets which do not match the PDR to packets which match the PDR exceeds a predetermined reference and the packets which do not match the PDR violate some conditions of the traffic filter included in the PDR which is a detection condition (for example, in case that one of a destination IP address, a destination port, a URL list, a domain name, and a protocol type is different), the NWDAF may infer that the application server has changed, and from the inference, to detect traffic of the application, the NWDAF may determine that the information on the PFD (in the case of the example above, the PFD included in the PDR) currently being used is no longer valid and should be modified by reflecting the change of the server.

In step 385, the NWDAF 325 may transmit, to the NEF 320, the collected data and PFD information required to be updated, discarded, or newly added as analysis information on PFD validity. The analysis information may include at least one piece of information among analytics ID=PFD Info, a UE ID, a SNSSAI, a DNN, a current PFD (or PDR), a packet count, a traffic duration, a transmission area, a transmission time, last transmission info, a threshold, an exception data indication, a list of unidentified packet transmissions (a destination IP address, a destination port, a URL list, and a protocol type), an updated PFD (or PDR), and an operation type. The operation type may include information for indicating whether the PFD information provided as analysis information from the NWDAF is for updating (replacing) the PFD currently being used by the NEF for detection of an application, is for deleting the PFD currently being used, or is for adding a new PFD for detection of the corresponding application.

In step 387, the NEF 320 may use the received information to update or discard the stored PFD information, or add new PFD information, and deliver the newly added or changed PFD information to the SMF 310 so that the SMF 310 delivers the information to the UPF 305. The UPF 305 may detect traffic of the application by applying the newly changed PFD, and collect charging data so as to be applied to charging.

Figure 4:
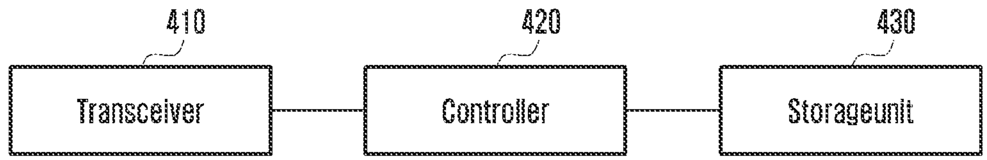
FIG. 4 illustrates a network entity that performs an NF according to an embodiment.

FIG. 4 illustrates a structure of a network entity which performs an NF according to an embodiment.

The network entity of FIG. 4 may be one of the above-described RAN, AMF, SMF, UPF, PCF, UDM, NSSF, NWDAF, DN, and NSACF.

Referring to FIG. 4, the network entity which performs an NF may include a transceiver 410, a controller 420, and a storage unit 430. The controller 420 may be defined as a circuit, an application-specific integrated circuit, or at least one processor.

The transceiver 410 may transmit or receive a signal to or from other network entities. The transceiver 410 may transmit or receive a signal or a message to or from an AMF which is a network entity which manages access and mobility of a UE to an AN.

The controller 420 may control the overall operation of the network entity which performs an NF according to an embodiment. For example, the controller 420 may control a signal flow between blocks so as to perform an operation according to the above-described flowcharts.

The storage unit 430 may store at least one of information transmitted or received through the transceiver 410 and information generated through the controller 420.

Figure 5:
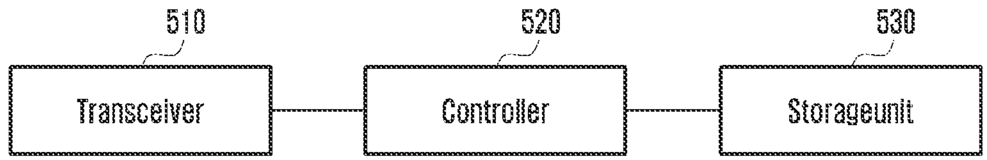
FIG. 5 illustrates a UE according to an embodiment.

FIG. 5 illustrates a structure of a UE according to an embodiment.

Referring to FIG. 5, a UE may include a transceiver 510, a controller 520, and a storage unit 530. The transceiver 510, the controller 520, and the storage unit 530 may operate according to the communication method of the UE described above. However, the components of the UE are not limited to the above-described examples. For example, the UE may include more or fewer components than the above-described components. For example, the UE may include the transceiver 510 and the controller 520. In addition, the transceiver 510, the controller 520, and the storage unit 530 may be implemented as a single chip.

The transceiver 510 is a general term for the UE's receiver and transmitter, and may transmit or receive a signal to or from a base station, other UEs, or network entities. A signal transmitted to or received from the base station may include control information and data. For example, the transceiver 510 may receive system information from the base station, and may receive a synchronization signal or a reference signal. To this end, the transceiver 510 may include a radio frequency (RF) transmitter configured to up-convert and amplify a frequency of a transmitted signal, an RF receiver configured to amplify a received signal with low noise and down-convert a frequency of the signal, and the like. However, this is only an example of the transceiver 510, and the components of the transceiver 510 are not limited to the RF transmitter and the RF receiver. The transceiver 510 may include a wired or wireless transceiver, may include various configurations for transmitting or receiving a signal, may receive a signal through a wireless channel to output the signal to the controller 520, and may transmit the signal output from the controller 520 through the wireless channel. In addition, the transceiver 510 may receive a communication signal to output the communication signal to a processor, and transmit the signal output from the processor to a network entity through a wired or wireless network.

The storage unit 530 may store a program and data required for an operation of the UE. In addition, a memory may store control information or data included in a signal obtained from the UE. The storage unit 530 may be configured by a storage medium such as a read only memory (ROM), a random access memory (RAM), a hard disk, a compact disc ROM (CD-ROM), and a digital versatile disc (DVD), or a combination of storage media.

In the disclosure, the controller 520 may be defined as a circuit, an application-specific integrated circuit, or at least one processor. The processor may include a communication processor (CP) which performs control for communication and an application processor (AP) which controls an upper layer such as an application program. The controller 520 may control the overall operation of the UE. For example, the controller 520 may control a signal flow between blocks so as to perform an operation according to the above-described flowcharts.

The methods according to various embodiments described herein may be implemented by hardware, software, or a combination of hardware and software.

In case that the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a ROM, an electrically erasable programmable read only memory (EEPROM), a magnetic disc storage device, a compact disc-ROM (CD-ROM), DVDs, or other type optical storage devices, or a magnetic cassette. Alternatively, any combination of some or all of them may form a memory in which the program is stored. A plurality of such memories may be included in the electronic device.

In addition, the programs may be stored in an attachable storage device which may access the electronic device through communication networks such as the Internet, Intranet, local area network (LAN), wide LAN (WLAN), and storage area network (SAN) or a combination thereof. Such a storage device may access the electronic device via an external port. A separate storage device on the communication network may access a portable electronic device.

Each block and combinations of blocks in the flowchart illustrations herein can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which includes one or more executable instructions for implementing the specified logical function(s). In some alternative implementations, the functions noted in the blocks may occur in a different order. For example, two blocks shown in succession may in fact be executed substantially concurrently or the blocks may sometimes be executed in the reverse order, depending upon the functionality involved.

While this disclosure has been illustrated and described with reference to various embodiments of the present disclosure, those skilled in the art will understand that various changes can be made in form and detail without departing from the spirit and scope of the present disclosure as defined by the appended claims and their equivalents.

What is claimed is:

1. A method performed by a network data collection and analysis function (NWDAF) in a wireless communication system, the method comprising:

receiving, from a network exposure function (NEF), a first message including a terminal identifier (ID) to request analysis information on a validity of packet flow detection (PFD) information;

transmitting, to the NEF, a second message as a response to the first message;

transmitting, to the NEF, a third message including the terminal ID to request the PFD information; and receiving, from the NEF, a fourth message including the terminal ID and packet detection rule (PDR) information as a response to the third message; and determining the validity of the PFD information based on information on exception traffic for the PDR information and a ratio of information on traffic corresponding to the PDR information and information on traffic that does not correspond to the PDR information.

2. The method of claim 1, further comprising:

transmitting, to a user plane function (UPF), a fifth message including the terminal ID and the PDR information to request collection of information on traffic of the terminal; and receiving, from the UPF, a sixth message as a response to the fifth message.

3. The method of claim 2, further comprising:

receiving, from the UPF, a seventh message including the information on traffic of the terminal, wherein the information on traffic of the terminal includes the terminal ID, the information on exception traffic for the PDR information, and the ratio of the information on traffic corresponding to the PDR information and the information on traffic that does not correspond to the PDR information.

4. The method of claim 3, further comprising:

transmitting, to the NEF, an eighth message including a result of the validity of the PFD information.

5. The method of claim 4, wherein the eighth message further includes information on processing of the PFD information and at least one information included in the information on traffic of the terminal of the seventh message.

6. The method of claim 3, wherein the seventh message further includes at least one of filter information applied to detect traffic, period information related to traffic, area information related to traffic, time information related to traffic, or packet number information related to traffic.

7. The method of claim 2, wherein the fifth message further includes at least one of a report period, an interest area, threshold information, or an indicator indicating whether to collect the exception traffic.

8. The method of claim 1, wherein the first message further includes information on at least one of an analysis ID, a network slice ID, a data network name, a reporting time, or a region of interest, wherein the third message further includes an event ID, and wherein the fourth message further includes at least one of the event ID or an application ID.

9. The method of claim 1, wherein the PDR information includes packet filter information, and wherein the packet filter information includes at least one of a source internet protocol (IP) address, a destination IP address, a source port, a destination port, a protocol type, a uniform resource locator (URL) list, or a domain name.

10. A network data collection and analysis function (NWDAF) in a wireless communication system, the NWDAF comprising:

a transceiver; and a controller configured to:

receive, from a network exposure function (NEF), a first message including a terminal identifier (ID) to request analysis information on a validity of packet flow detection (PFD) information, transmit, to the NEF, a second message as a response to the first message, transmit, to the NEF, a third message including the terminal ID to request the PFD information, receive, from the NEF, a fourth message including the terminal ID and packet detection rule (PDR) information as a response to the third message, and determine the validity of the PFD information based on information on exception traffic for the PDR information and a ratio of information on traffic corresponding to the PDR information and information on traffic that does not correspond to the PDR information.

11. The NWDAF of claim 10, wherein the controller is further configured to:

transmit, to a user plane function (UPF), a fifth message including the terminal ID and the PDR information to request collection of information on traffic of the terminal, and receive, from the UPF, a sixth message as a response to the fifth message.

12. The NWDAF of claim 11, wherein the controller is further configured to receive, from the UPF, a seventh message including the information on traffic of the terminal, and wherein the information on traffic of the terminal includes the terminal ID, the information on exception traffic for the PDR information, and the ratio of the information on traffic corresponding to the PDR information and the information on traffic that does not correspond to the PDR information.

13. The NWDAF of claim 12, wherein the controller is further configured to:

transmit, to the NEF, an eighth message including a result of the validity of the PFD information.

14. The NWDAF of claim 13, wherein the eighth message further includes information on processing of the PFD information and at least one information included in the information on traffic of the terminal of the seventh message.

15. The NWDAF of claim 12, wherein the seventh message further includes at least one of filter information applied to detect traffic, period information related to traffic, area information related to traffic, time information related to traffic, or packet number information related to traffic.

16. The NWDAF of claim 11, wherein the fifth message further includes at least one of a report period, an interest area, threshold information, or an indicator indicating whether to collect the exception traffic.

17. The NWDAF of claim 10, wherein the first message further includes information on at least one of an analysis ID, a network slice ID, a data network name, a reporting time, or a region of interest, wherein third message further includes an event ID, and wherein the fourth message further includes at least one of the event ID or an application ID.

18. The NWDAF of claim 10, wherein the PDR information includes packet filter information, and wherein the packet filter information includes at least one of a source internet protocol (IP) address, a destination IP address, a source port, a destination port, a protocol type, a uniform resource locator (URL) list, or a domain name.

* * * * *